(12) United States Patent
Twerdahl

(10) Patent No.: US 7,260,387 B2
(45) Date of Patent: Aug. 21, 2007

(54) MUTE-UNTIL FEATURE FOR ELECTRONIC DEVICES

(75) Inventor: Timothy D. Twerdahl, Los Altos, CA (US)

(73) Assignee: Inventec Appliances Corporation, Taipei (TW)

( * ) Notice: Subject to any disclaimer, the term of this patent is extended or adjusted under 35 U.S.C. 154(b) by 175 days.

(21) Appl. No.: 10/866,497

(22) Filed: Jun. 10, 2004

(65) Prior Publication Data

US 2005/0233777 A1    Oct. 20, 2005

Related U.S. Application Data

(60) Provisional application No. 60/562,941, filed on Apr. 16, 2004.

(51) Int. Cl.
*H04M 3/00*    (2006.01)

(52) U.S. Cl. .................... 455/418; 455/425; 455/567

(58) Field of Classification Search ............... 455/566, 455/95, 550.1, 556.1, 567, 425, 418
See application file for complete search history.

(56) References Cited

U.S. PATENT DOCUMENTS

| | | | | |
|---|---|---|---|---|
| 5,483,689 | A * | 1/1996 | O'Donnell et al. | 455/200.1 |
| 6,816,703 | B1 * | 11/2004 | Wood et al. | 455/3.04 |
| 7,127,260 | B1 * | 10/2006 | Kim et al. | 455/456.4 |
| 7,142,877 | B2 * | 11/2006 | Lipovski | 455/456.4 |
| 2002/0068558 | A1 * | 6/2002 | Janik | 455/422 |
| 2004/0106432 | A1 * | 6/2004 | Kanamori et al. | 455/556.1 |
| 2005/0237862 | A1 * | 10/2005 | Choi | 368/250 |

\* cited by examiner

*Primary Examiner*—Temica Beamer
*Assistant Examiner*—Joy Contee
(74) *Attorney, Agent, or Firm*—Carr & Ferrell LLP

(57) ABSTRACT

An electronic device such as a cell phone, PDA, or handheld gaming device is provided with a mutable function such as an alarm function, a mute function, and a mute-until function. The mute function mutes the mutable function until deactivated. The mute-until function automatically deactivates the mute function after a condition has been satisfied.

28 Claims, 3 Drawing Sheets

MUTE-UNTIL FEATURE FOR ELECTRONIC DEVICES

CROSS REFERENCE TO RELATED APPLICATIONS

This application claims the benefit of U.S. Provisional Patent Application Ser. No. 60/562,941, filed Apr. 16, 2004, entitled "Mute-Until Feature for Electronic Devices," which is incorporated herein by reference in its entirety.

BACKGROUND OF THE INVENTION

1. Field of the Invention

The present invention relates generally to the field of consumer electronics and more particularly to electronic devices that include mutable alarms.

2. Description of the Prior Art

Many electronic devices include alarm functions that can be muted. Examples include cell phones, personal digital assistants (PDAs) and gaming devices. In the case of cell phones, for instance, one type of alarm function is an incoming call signal. An alarm of the incoming call signal can be either an audible ringer or a vibrational ringer. Many cell phones allow the user to switch between the audible ringer and the vibrational ringer. Another alarm function that is common amongst electronic devices is a calendared event reminder that activates the alarm upon the calendared event. Another common alarm function is a count-down timer that triggers the alarm after a predetermined time has elapsed.

Typically, electronic devices allow the audible alarms to be muted because such alarms are unwelcome in various environments. Thus, users commonly mute their electronic devices upon entering meetings, theaters, courtrooms, and so forth. A common experience for users of electronic devices, unfortunately, is a missed call or meeting because the user forgot to remove the mute from the alarm function once it was no longer necessary. Therefore, what is needed is a way to automatically remove the mute function from alarm functions.

SUMMARY

The invention provides an electronic device comprising a mutable function, a mute function that can be activated to mute the mutable function, and a mute-until function capable of automatically deactivating the mute function when a condition is satisfied. The electronic device can be, for instance, a cell phone, a PDA, a gaming device, or another portable device. In some embodiments the mutable function can be an alarm function including a calendared event reminder, a count-down timer, or a signaling alarm such as an incoming call signal. The mutable function can also be a volume control. The condition that will cause the mute-until function to deactivate the mute function can be, for example, a timing event such as an expiration of a set period of time or an arrival of a predetermined time of day. The condition can also be an end of a usage session such as the end of a game or the completion of a task.

The invention also provides an electronic device comprising a display screen, an input device, and a processor. The processor is configured to display a graphical user interface on the display screen, receive user input from the input device, and provide an alarm function including an alarm, a mute function that can be activated to mute the alarm, and a mute-until function capable of automatically deactivating the mute function when a condition is satisfied. In some embodiments an application running on the processor provides the alarm function, while in some other embodiments an operating system running on the processor provides the alarm function.

In some embodiments the mute-until function provides user-selectable choices through the graphical user interface. Such user-selectable choices can include more than one duration of time for the mute function or more than one time of day when the mute function can be deactivated. The mute-until function is customizable, in some embodiments, by receiving input from the input device. The input can be, for example, a time of day when the mute function will be deactivated, or a period of time after which the mute function will be deactivated. In other embodiments the input can also be the condition which can be, for instance, an end of a usage session.

DETAILED DESCRIPTION OF THE INVENTION

The present invention provides a function, termed "a mute-until function," that automatically removes a mute function from an alarm function, or similar feature, of an electronic device. Essentially, the mute-until function provides a means for limiting the duration of the mute function, for example, by automatically deactivating the mute function after a particular condition, such as an expiration of a time period, has been satisfied.

Figure 1:
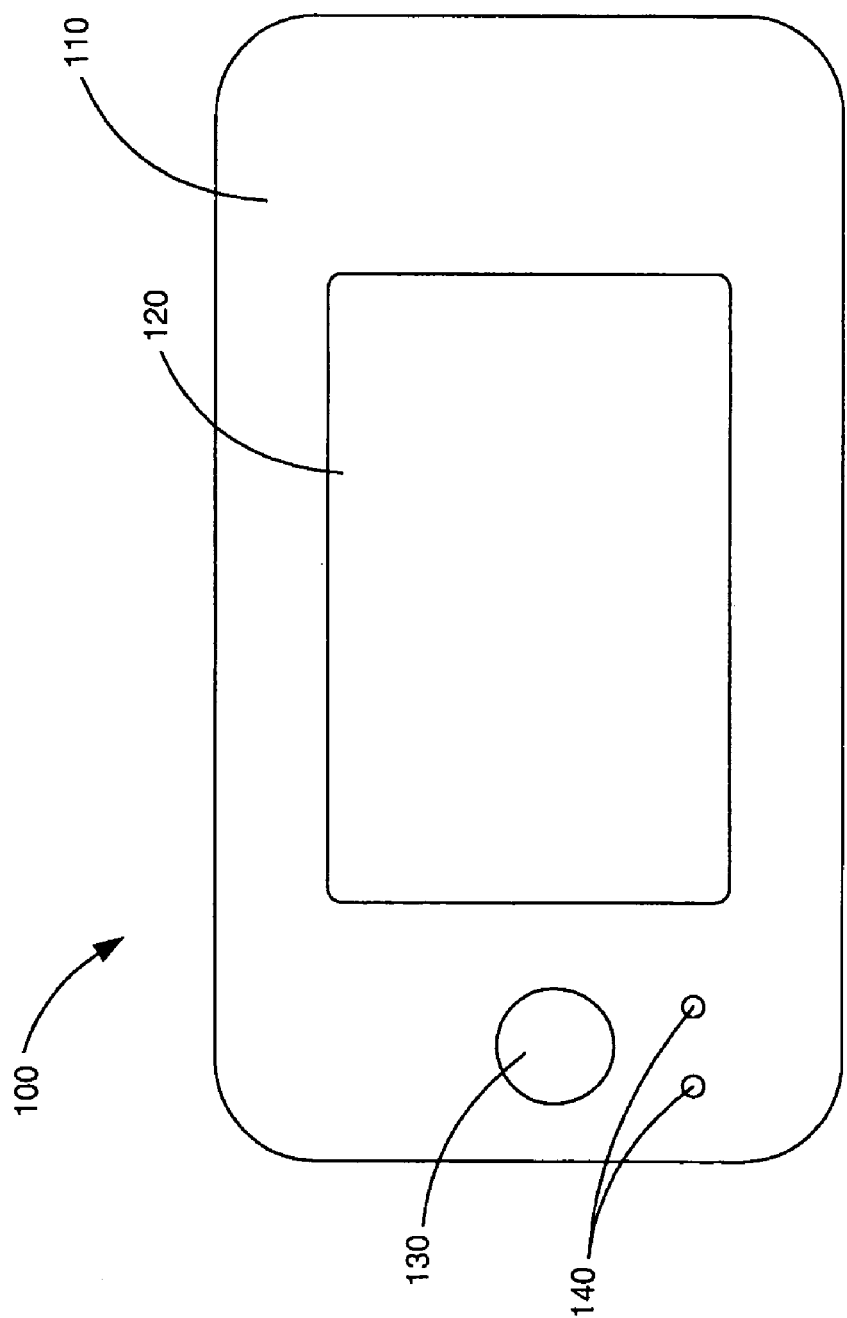
FIG. 1 is a schematic representation of an exemplary electronic device on which the present invention can be implemented.

FIG. 1 illustrates an exemplary electronic device 100 on which the present invention can be implemented. The electronic device 100 comprises a housing 110, a display screen 120, and input devices 130 and 140 that can be, for example, an analog joystick and digital switches. In some embodiments, the display screen 120 is a touch sensitive device and also constitutes an input device. The electronic device 100 can be, for instance, a cell phone, a Personal Digital Assistant (PDA), a handheld gaming device, a Global Positioning Satellite (GPS) system, and so forth. Although the present invention is described in terms of easily portable electronic devices, it will be readily appreciated that the present invention can be implemented with many other types of devices that can be muted, for example, desktop computers, stereo systems, alarm clocks, televisions, etc.

The electronic device 100 includes a processor (not shown) that implements the various functionalities of the electronic device 100 and preferably presents content through a graphical user interface (GUI) on the display screen 120. The processor is configured to receive user input from the various input devices 120, 130, and 140. It will be understood that in some embodiments, the input device may be disposed on a remote control (for a television) or on a keyboard (for a desktop computer). Also, in some embodiments, activating the mute function is achieved through the use of a dedicated mute button.

In some embodiments, one of the functionalities of the electronic device 100 is an alarm function that includes an alarm. The alarm can be basically any means for attracting the attention of the user and can include an audible alarm, a vibrational alarm, a visual alarm, or any combination of these. In some embodiments of the electronic device 100, the alarm function includes more than one type of alarm that the user can select between, for example between the audible alarm and the vibrational alarm.

In some embodiments, the alarm function is timing-related and the alarm is triggered to alert the user at a predetermined time or after some duration of time has elapsed. Examples of such timing-related alarm functions include calendared event reminders and count-down timers. In some other embodiments, the alarm function is a signaling alarm. In these embodiments the alarm of the alarm function is triggered by an incoming phone call, a received text message, a page, or some other triggering event.

In addition or in the alternative to an alarm function, the electronic device 100 can have other functionalities that are subject to a mute function. A simple example is a volume control. The volume control regulates the intensity of sounds generated by the electronic device 100. Sounds can be produced by an operating system (e.g., by navigating through menus) or by applications running on the electronic device 100 such as by gaming applications, a media player, and so forth. In some instances the volume control is a device-level function that regulates the volume of all sounds produced by the electronic device 100. In some other instances the volume control is a specific function of an individual application. For example, a media player application of the electronic device 100 can incorporate a volume control and the electronic device 100 can also include a device-level volume control.

Another functionality of the electronic device 100 is a mute function. The mute function is operable to mute one or more mutable functions such as an alarm function or a volume control. As used herein, "to mute" means to at least partially reduce, substantially reduce, or completely disables an output of a mutable function, and although muting is described herein generally in terms of affecting the intensity of the output, muting can also affect the duration of the output. Thus, muting an audible alarm or other sound-producing function either reduces or prevents the sound output therefrom. Muting a visual function, such as a flashing LED, reduces or eliminates an intensity of the light output therefrom. Muting a vibrational alarm, as another example, reduces or eliminates the intensity of the vibration. It will be appreciated that the mute function, in some embodiments, additionally provides an alternative to a mutable function. For example, a mute function, in some embodiments, not only mutes an audible alarm but also provides a vibrational alarm in place of the audible alarm.

The mute-until function of the electronic device 100 is a function that is capable of deactivating the mute function when a condition is satisfied. When the mute function is deactivated, the mutable function is restored to an un-muted state. The condition can be a timing event, an end of a usage session, or an occurrence of some event, for example. Timing events include an expiration of a set period of time, or the arrival of a predetermined time of day. The end of a usage session can be an end of a game or a completion of a task. Other events that the mute-until functions can be predicated upon include inserting a memory card into the electronic device 100 or receipt of a telephone call from a particular phone number. These and other conditions that can cause the mute-until function to deactivate the mute function are described below with reference to FIGS. 2-4 that illustrate an exemplary implementation of the present invention.

Figure 2:
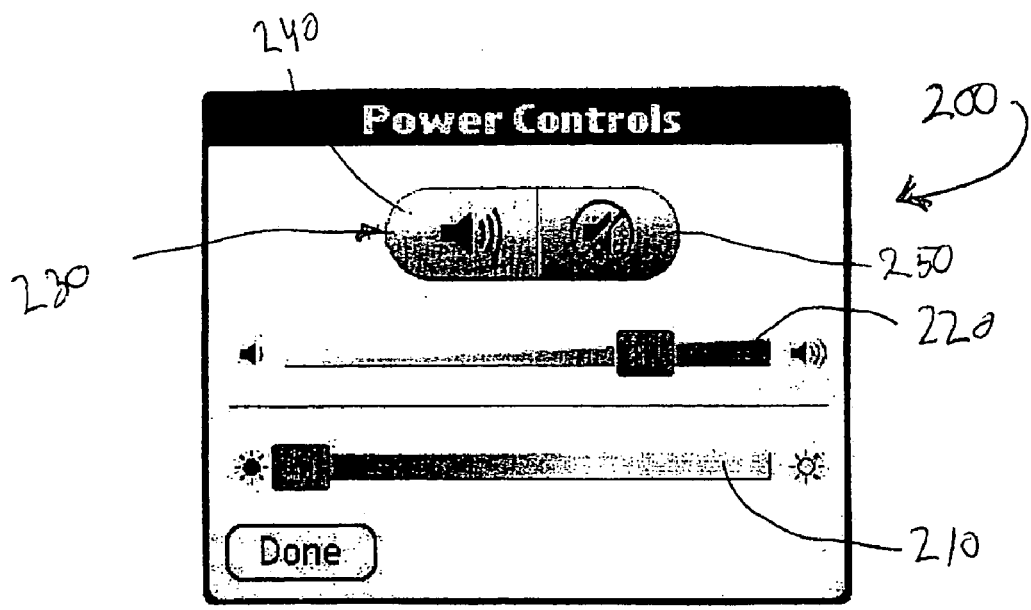
FIG. 2 is an exemplary control panel displayed on the electronic device of FIG. 1 for allowing a user to set a mute function according to an embodiment of the present invention.

FIG. 2 shows an exemplary control panel 200 for displaying information regarding settings of the electronic device 100 (FIG. 1) and for allowing user control over such settings. In the example of FIG. 2, a slider 210 both illustrates and allows control over screen brightness. Another slider 220 illustrates and allows control over sound volume, and a two-position mute toggle 230 illustrates and allows control over a mute function. In the example of FIG. 2, the mute toggle 230 indicates that a mute function is deactivated by an illuminated sound button 240 and a darkened mute button 250. Accordingly, the slider 220 shows a sound volume setting. It will be appreciated that slider 210 is not essential to the present invention and is merely illustrative of the many types of controls that may be presented in the control panel 200 in addition to a control over the mute function. For example, the alarm function can be accessed through control panel 200 in some embodiments.

Figure 3:
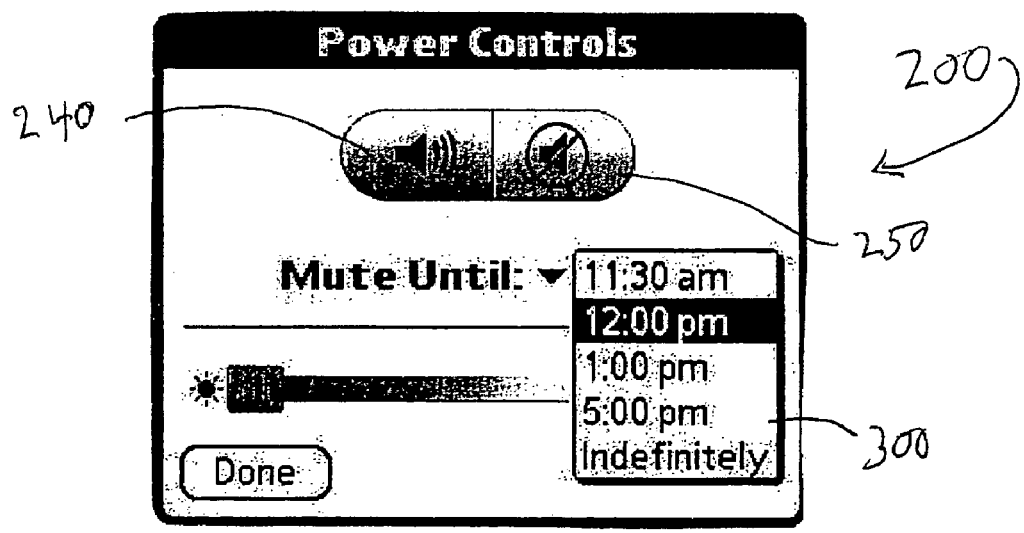
FIG. 3 shows the control panel of FIG. 2 after a mute function has been selected and includes a Mute-Until Window according to an embodiment of the present invention.

FIG. 3 shows the control panel 200 after the mute button 250 has been selected through use of the input device 120, 130 or 140 (FIG. 1). In FIG. 3 it can be seen that the sound button 240 is darkened and the mute button 250 is illuminated to indicate that sound has been muted. Additionally, it can be seen that selecting the mute function causes a Mute Until window 300 to be displayed within the control panel 200. It will be understood, however, that the Mute Until window 300 can appear anywhere in the GUI.

The Mute Until window 300 provides a number of choices to the user that can be selected through one of the input devices 120, 130 or 140. In the given example, the user may select a time at which the mute function will be disabled. A further option is to leave mute on indefinitely. In the illustrated example, the choices are calculated to be certain time periods beyond the present time such as a half hour, one hour, two hours, and six hours beyond the present time. Alternately, rather than displaying the time at which the mute function will be disabled, the choices in the Mute Until window 300 can be expressed in terms of a duration that mute will remain activated. In some embodiments, the device 100 (FIG. 1) allows the user to switch between "time" and "duration" displays. Further customization over the specific time periods can also be provided. In some embodiments, the user can enter the time at which the mute function will be disabled (e.g., Mute Until 4:25 pm), or the duration that the mute function will be enabled (e.g., Mute For 1 hour 20 minutes).

Figure 4:
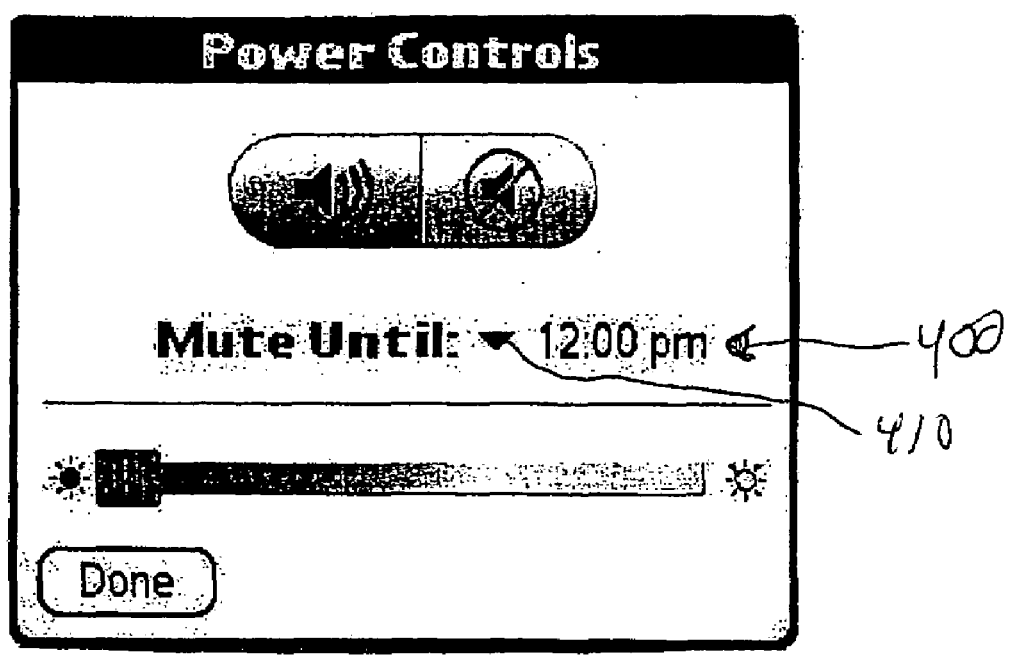
FIG. 4 shows the control panel of FIG. 2 after a setting has been selected from the Mute Until window and the Mute Until window has been replaced by a Mute Until status indicator according to an embodiment of the present invention.

In some instances, after a setting has been selected from the Mute Until window 300, the Mute Until window 300 is replaced by a Mute Until status indicator 400 that displays the selection, as shown in FIG. 4. In some of these embodiments, the Mute Until status indicator 400 includes a selectable icon 410 that allows the Mute Until window 300 to be redisplayed to make another selection. While the embodiment illustrated in FIG. 4 indicates with text that the mute-until function is activated and the time at which the mute function will be deactivated, in some embodiments, the status of the mute-until function is indicated with an appropriate icon. In other embodiments, when the mute-until function is activated, the status is indicated by a lit LED on the electronic device 100 (FIG. 1).

Referring again to FIG. 1, it will be appreciated that although a GUI displayed on the display screen 120 provides a convenient and versatile interface for initiating the mute-until function and providing the user with options relating thereto, the display screen 120 is not strictly necessary to the present invention. In some embodiments, for example, the mute-until function can be activated by pressing a dedicated button or switch on the electronic device 100. In other embodiments that lack a dedicated mute-until button, a multi-function button pressed in a correct sequence will activate the mute-until function. For instance, one push of the button activates the mute function; two pushes within a short time span, such as 3 seconds, additionally activates the mute-until function for a set period, such as 30 minutes; three pushes with a short time span sets the mute-until function for an hour; and so forth.

Once the selected time arrives, the mute-until function disables the mute function. This can be accompanied, in some embodiments, by an audible tone or beep, or some other signal such as a flashing LED, a vibration, a symbol displayed upon the display screen 120 (FIG. 1), or a combination of these.

It will be appreciated that the mute-until function can be tied to conditions of indefinite duration, in contrast to the length of time and time of day conditions described above. For instance, in the example of the above gaming device, the mute-until function can be configured to disable the mute function at the end of game play. Generalizing, the mute-until function can be configured, in some embodiments, to disable the mute function at the end of a usage session, where a usage session can be defined as the end of a game, the completion of a task, the closing of an application, the end of a calendared meeting, and other like events. In other embodiments the mute and mute-until functions can be configured to apply automatically to an event such as the opening of an application or the insertion of a memory card. For example, an electronic device 100 having a sound recording application can be configured such that whenever the recording application is actively making a recording the mute function is also activated, and the mute-until function is at the same time set to disable the mute function in the event that recording stops. It should also be noted that where an electronic device 100 has multiple audio and/or alarm functions, the mute-until function can be selectively configured to apply to some audio functions and/or alarm functions and not to others.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An electronic device comprising:
   a mutable function;
   a mute function that can be activated to mute the mutable function; and
   a mute-until function capable of automatically deactivating the mute function when a condition is satisfied, wherein the condition may be customized by a user of the electronic device.

2. The electronic device of claim 1 wherein the electronic device is a cell phone.

3. The graphical electronic device of claim 1 wherein the electronic device is a FDA.

4. The electronic device of claim 1 wherein the electronic device is a gaming device.

5. The electronic device of claim 1 wherein the electronic device is a portable device.

6. The electronic device of claim 1 wherein the mutable function is an alarm function.

7. The electronic device of claim 6 wherein the alarm function is a calendared event reminder.

8. The electronic device of claim 6 wherein the timing-related alarm function is a countdown timer.

9. The electronic device of claim 6 wherein the alarm function is signaling alarm.

10. The electronic device of claim 1 wherein the signaling alarm is an incoming call signal.

11. The electronic device of claim 1 wherein the mutable function is a volume control.

12. The electronic device of claim 1 wherein the condition is a timing event.

13. The electronic device of claim 12 wherein the timing event is an expiration of a set period of time.

14. The electronic device of claim 12 wherein the timing event is an arrival of a predetermined time of day.

15. The electronic device of claim 1 wherein the condition is an end of a usage session.

16. The electronic device of claim 15 wherein the usage session is a game.

17. The electronic device of claim 15 wherein the usage session is a task.

18. An electronic device comprising:
    a display screen;
    an input device; and
    a processor configured to
       display a graphical user interface on the display screen,
       receive user input from the input device, and
       provide
          an alarm function including an alarm,
          a mute function that can be activated to mute the alarm, and
          a mute-until function capable of automatically deactivating the mute function when a condition is satisfied, wherein the condition may be customized by a user of the electronic device.

19. The electronic device of claim 18 wherein an application running on the processor provides the alarm function.

20. The electronic device of claim 18 wherein an operating system running on the processor provides the alarm function.

21. The electronic device of claim 18 wherein the mute-until function provides user-selectable choices through the graphical user interface.

22. The electronic device of claim 21 wherein the user-selectable choices include more than one duration of time for the mute function.

23. The electronic device of claim 21 wherein the user-selectable choices include more than one time of day when the mute function can be deactivated.

24. The electronic device of claim 18 wherein the mute-until function is customizable by receiving input from the input device.

25. The electronic device of claim 24 wherein the input is a time of day when the mute function Will be deactivated.

26. The electronic device of claim 24 wherein the input is a period of time after which the mute function will be deactivated.

27. The electronic device of claim 24 wherein the input is the condition.

28. The electronic device of claim 27 wherein the input is an end of a usage session.

* * * * *